United States Patent
Itoga (10) Patent No.: US 7,661,697 B2
(45) Date of Patent: Feb. 16, 2010

(54) ATTACHING STRUCTURE FOR AIR BELT INFLATOR

(75) Inventor: Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 226 days.

(21) Appl. No.: 11/529,429

(22) Filed: Sep. 29, 2006

(65) Prior Publication Data

US 2007/0080526 A1 Apr. 12, 2007
US 2009/0230662 A9 Sep. 17, 2009

Related U.S. Application Data

(63) Continuation-in-part of application No. 11/067,227, filed on Feb. 25, 2005, now Pat. No. 7,481,452.

(30) Foreign Application Priority Data

Oct. 7, 2005 (JP) ............... 2005-295245

(51) Int. Cl.
*B60R 21/16* (2006.01)
(52) U.S. Cl. .................. 280/728.2
(58) Field of Classification Search .............. 280/728.2, 280/730.1, 730.2, 733
See application file for complete search history.

(56) References Cited

U.S. PATENT DOCUMENTS

| | | | | |
|---|---|---|---|---|
| 3,682,498 A | * | 8/1972 | Rutzki | 280/733 |
| 3,841,654 A | * | 10/1974 | Lewis | 280/733 |
| 3,866,940 A | * | 2/1975 | Lewis | 280/733 |
| 3,970,329 A | * | 7/1976 | Lewis | 280/733 |
| 5,899,485 A | | 5/1999 | Folsom et al. | |
| 6,109,647 A | * | 8/2000 | Akaba et al. | 280/733 |
| 6,142,512 A | * | 11/2000 | Suyama | 280/733 |
| 6,276,715 B1 | * | 8/2001 | Takeuchi | 280/733 |
| 6,305,710 B1 | * | 10/2001 | Bosgieter et al. | 280/753 |
| 6,336,657 B1 | * | 1/2002 | Akaba et al. | 280/733 |
| 6,471,243 B1 | * | 10/2002 | Brown | 280/733 |
| 6,863,298 B2 | | 3/2005 | Sakai et al. | |
| 2005/0184491 A1 | | 8/2005 | Itoga | |
| 2005/0189749 A1 | * | 9/2005 | Itaoga et al. | 280/733 |
| 2006/0186645 A1 | | 8/2006 | Aulbach | |

FOREIGN PATENT DOCUMENTS

| | | | |
|---|---|---|---|
| EP | 1 216 895 B1 | | 6/2002 |
| EP | 1 550 588 B1 | | 7/2005 |
| JP | 10-217818 | | 8/1998 |
| JP | 2001-213256 | | 8/2001 |
| JP | 2003-312439 | | 11/2003 |
| JP | 2003312439 A | * | 11/2003 |
| JP | 2004-98753 | | 4/2004 |
| JP | 2004-106651 | | 4/2004 |
| JP | 2005-231504 | | 9/2005 |

* cited by examiner

*Primary Examiner*—Paul N Dickson
*Assistant Examiner*—Robert A Coker
(74) *Attorney, Agent, or Firm*—Foley & Lardner LLP (57) ABSTRACT

An inflator attaching structure is capable of firmly attaching an inflator to a seat member or the like. An inflator attaching structure includes an attaching clamp that is composed of a main plate connected to a seat frame, and a sub-plate attached to the main plate, and an inflator is sandwiched between the main plate and the sub-plate. When attaching the inflator to the attaching clamp, a hook portion of the sub-plate is hooked on a hook-portion hooking opening of the main plate, and thereafter the fastening portion and the base piece portion are fastened by a bolt upon situating the fastening portion of the sub-plate in parallel with the base piece portion of the main plate in a manner so as to sandwich the inflator between the main plate and the sub-plate.

4 Claims, 5 Drawing Sheets

ATTACHING STRUCTURE FOR AIR BELT INFLATOR

This application claims priority to and is a continuation-in-part of U.S. patent application Ser. No. 11/067,227, filed Feb. 25, 2005 (now U.S. Pat. No. 7,481,452).

BACKGROUND

The present invention relates to an inflator attaching structure in which an inflator for expanding an occupant-restraining device is attached to a member of a vehicle body side, and more specifically, it relates to an inflator attaching structure to be applied to, for example, an occupant-restraining device or the like configured to prevent a body of an occupant from moving forward when in forward collision. Further, the present invention relates to a lap anchor for connecting a base end side of a lap portion of an air belt to a seat member.

As a system for restraining an occupant of a motor vehicle when in a car crash, a device for raising a front portion of a seat cushion when in a car crash so that a submarine phenomenon, in which the occupant has a behavior to slip through a lower side of a lap belt when in a car crash even when the occupant wears a seatbelt, is prevented is proposed. For example, a seat for use in a motor vehicle configured to push up a front end portion of a seat cushion by mechanism of an airbag is described in the Japanese Unexamined Patent Application Publication No. 10-217818 ("JP Pub. No. '818"), which is incorporated by reference herein in its entirety. In JP Pub. No. '818, an inflator is arranged in an internal part of the airbag.

As an occupant restraining device, an air belt device (expansion-type seatbelt device) is known, such as described in, for example, Japanese Unexamined Patent Application Publication No. 2003-312439 ("JP Pub. No. '439"), which is incorporated by reference herein in its entirety. In the air belt device described in JP Pub. No. '439, both a shoulder belt and a lap belt are configured to be expandable. Each of the end sides of the expansion-type shoulder belt and the expansion-type lap belt are connected to a tongue having a duct, and gas supplied from an inflator (gas generator) is configured to be introduced into the shoulder belt and the lap belt via the tongue (duct). Incidentally, the other end side of the lap portion is connected to a lap anchor, and the lap anchor is connected to a side face portion of a seat frame.

This inflator is firmly fixed to a buckle, and the buckle is connected to a side face portion at a side of the seat frame opposite to the lap anchor (refer to FIGS. 3 and 4 in the JP Pub. No. '439). In the buckle, a gas-supplying passage to be communicated with the duct of the tongue is provided.

In JP Pub. No. '439, only a tip end of the inflator having a straight rod like shape is connected to the buckle and therefore, connecting strength of the inflator is presumed to be relatively low.

SUMMARY

One embodiment of the invention relates to an inflator attaching structure in which an inflator for expanding a bag of an occupant-restraining device is attached to a member of a vehicle body side via an attaching member. The attaching member comprises: a main plate attached to a member of the vehicle body side; and a sub-plate attached to the main plate. The inflator is sandwiched between the main plate and the sub-plate.

Another embodiment of the invention relates to a lap anchor. A base end side of a lap portion of an expandable air belt is drawn around a front side of an occupant seated on a seat, and is connected to the lap anchor. The lap anchor is attached to a seat member in a manner so as to be rotatable in a front-and-back direction of the seat. An inflator for expanding the air belt is attached to the lap anchor.

Another embodiment of the invention provides an occupant protection device for a vehicle. The occupant protection device comprises: an inflatable air belt with a lap portion and a shoulder portion; an inflator to inflate the air belt; and an attaching member to attach the inflator to a seat body part. A portion of the lap portion is connected to the attaching member, and a duct portion of the lap portion is configured to receive inflation fluid from the inflator. The attaching member comprises a main plate and a sub-plate, and the inflator is positioned between the main plate and the sub-plate.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

An object of the present invention is to provide an inflator attaching structure by which an inflator can be firmly attached to a seat member or the like.

Further, another object of the present invention is to provide a lap anchor capable of attaching an inflator for use in an air belt.

An inflator attaching structure according to a first embodiment is characterized in that in the inflator attaching structure in which an inflator for expanding a bag of an occupant-restraining device is attached to a member of a vehicle body side via an attaching member, the attaching member includes a main plate attached to a member of the vehicle body side and a sub-plate attached to the main plate, the inflator is sandwiched between the main plate and the sub-plate.

The inflator attaching structure according to a second embodiment is characterized in that a hook portion is provided at either one of the main plate or the sub-plate, and a hook opening to be caught by the hook portion is provided at the other plate. The hook portion catches the hook opening in the main plate and the sub-plate. Portions of the main plate and the sub-plate that are at a side opposite to the hook and hook openings across the inflator are fastened by mechanism of a fastening member.

The inflator attaching structure according to a third embodiment is characterized in that a plate thickness of the sub-plate is configured to be smaller than a plate thickness of the main plate.

The inflator attaching structure according to a fourth is characterized in that a convex portion for positioning is provided in either one of an outer peripheral surface of the inflator or an inflator-opposed surface of the main plate or the sub-plate, and an engaging portion for engaging the convex portion is provided in the other surface.

The inflator attaching structure according to a fifth embodiment is characterized in that the member of the vehicle body side is a seat member.

The inflator attaching structure according to a sixth embodiment is characterized in that the attaching member is a lap anchor for fixing a base end side of a lap portion of an expandable air belt to the seat member. The base end side of the lap portion is connected to the main plate. The main plate is attached to the seat member in a manner so as to be rotatable in a front-and-back direction of a seat. The inflator sandwiched between the main plate and sub-plate is connected to the air belt in a manner so as to be able to supply gas to the air belt.

The lap anchor of a seventh embodiment is characterized such that a base end side of the lap portion of an expandable air belt being drawn around a front side of an occupant seated on a seat, is connected, and which is attached to a seat member in a manner so as to be rotatable in a front-and-back direction of the seat, and an inflator for expanding the air belt is attached to the lap anchor.

The lap anchor according to an eighth embodiment includes a main plate to be attached to the seat member, and a sub-plate to be attached to the main plate, and the inflator is sandwiched between the main plate and the sub-plate.

The lap anchor according to a ninth embodiment is characterized in that a hook portion is provided at either one of the main plate or the sub-plate, and a hook opening to be caught by the hook portion is provided at the other plate. The hook portion catches the hook opening in the main plate and the sub-plate. Portions of the main plate and the sub-plate that are at a side opposite to the hook and hook openings across the inflator are fastened by mechanism of a fastening member.

The lap anchor according to a tenth embodiment is characterized in that a plate thickness of the sub-plate is configured to be smaller than a plate thickness of the main plate.

The lap anchor according to an eleventh embodiment is characterized in that a convex positioning portion is provided in either one of an outer peripheral surface of the inflator or an inflator-opposed surface of the main plate or the sub-plate, and an engaging portion for engaging the convex portion is provided in the other surface.

In an inflator attaching structure according to an embodiment of the invention, since the inflator is sandwiched between a main plate and a sub-plate, and the main plate is attached to a member of a vehicle body side, such that the inflator is firmly attached to the member of the vehicle body side.

In the inflator attaching structure of the second embodiment, the hook portion is hooked on the hook opening, and the sub-plate is configured to be situated in parallel with the main plate in an overlapping manner such that the inflator is sandwiched between the main plate and the sub-plate, and then the main plate the sub-plate are fastened with by mechanism of a fastening member. Thereby, the inflator can be sandwiched between the main plate and the sub-plate. Thus, the fastening operation is performed after the hook portion is hooked on the hook opening, and the sub-plate can be thereby easily fastened with the main plate.

In the inflator attaching structure according to an embodiment of the present invention, since the main plate is attached to the member of the vehicle body side, an attaching strength of the inflator may be sufficiently high even when the plate thickness of the sub-plate is configured to be smaller than the plate thickness of the main plate. Therefore, the weight of the sub-plate can reduced by reducing the thickness of the sub plate. Further, a bending process for the sub-plate may be easily performed.

A convex positioning portion is provided in either one of an outer peripheral surface of the inflator or an inflator-opposed surface of the main plate or the sub-plate, and an engaging portion for engaging the convex portion is provided in the other surface. The positioning operation for the inflator can be easily performed by engaging the convex portion for positioning with the engaging portion.

Embodiments of the present invention can be applied to a case in which the inflator is attached to a seat member serving as a member of the vehicle body side such as, for example, a seat frame or a seat finisher.

In the sixth embodiment, the attaching member is a lap anchor for firmly fixing a base end side of a lap portion of an air belt to the seat member, and the base end side of the lap anchor is connected to the main plate, and the main plate is attached to the seat member in a manner so as to be rotatable in a front-and-back direction of the seat. The inflator for use in the air belt is sandwiched between the main plate and the sub-plate and the inflator is connected to the air belt.

In the sixth embodiment, since the inflator for use in the air belt is held on the lap anchor, the inflator can be integrally rotated with the lap anchor along with a movement of the air belt.

In a lap anchor according to a seventh embodiment, since the inflator for use in the air belt is attached to the lap anchor, the inflator can be integrally rotated with the lap anchor along with a movement of the air belt.

In the lap anchor according to an eighth embodiment, since the inflator is sandwiched between the main plate and the sub-plate, and the main plate is attached to a member of the vehicle body side, and the inflator is firmly attached to the seat member.

In the lap anchor according to a ninth embodiment, the hook portion is hooked on the hook opening, the sub-plate is situated in parallel with the main plate in an overlapping manner and in a manner such that the inflator is sandwiched between the main plate and the sub-plate, and then the main plate and the sub-plate are fastened by a fastening member. As a result, the inflator can be sandwiched between the main plate and the sub-plate. Thus, the fastening work is performed after the hook portion is hooked on the hooked potion, and therefore the sub-plate can be easily fastened with the main plate.

In the lap anchor according to an embodiment of the present invention, since the main plate is attached to the seat member, the attaching strength can be sufficiently high even when the plate thickness of the sub-plate is configured to be smaller than the plate thickness of the main plate. The weight of the sub-plate can reduced by reducing the thickness of the sub-plate. Further, a bending process for the sub-plate can be easily performed.

A convex positioning portion is provided in either one of an outer peripheral surface of the inflator or an inflator-opposed face of the main plate or the sub-plate, and an engaging portion for engaging the convex portion is provided in the other surface. The convex portion is engaged with the engaging portion. Thus, the positioning operation for the inflator can be easily performed.

Hereinbelow, the embodiment will be explained referring to the drawings.

Figure 1:
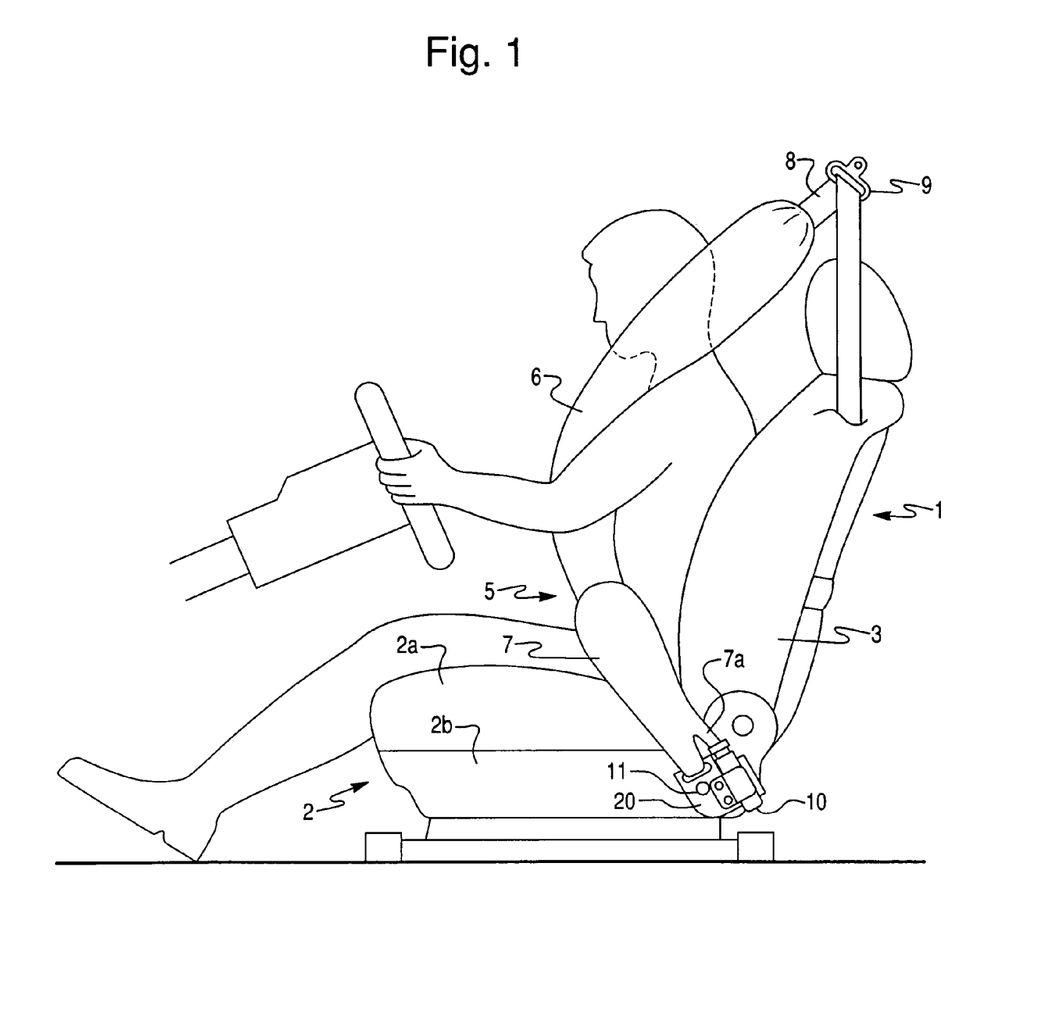
FIG. 1 is a side elevation showing a motor vehicle seat provided with an inflator attaching structure with respect to an embodiment.
Figure 2:
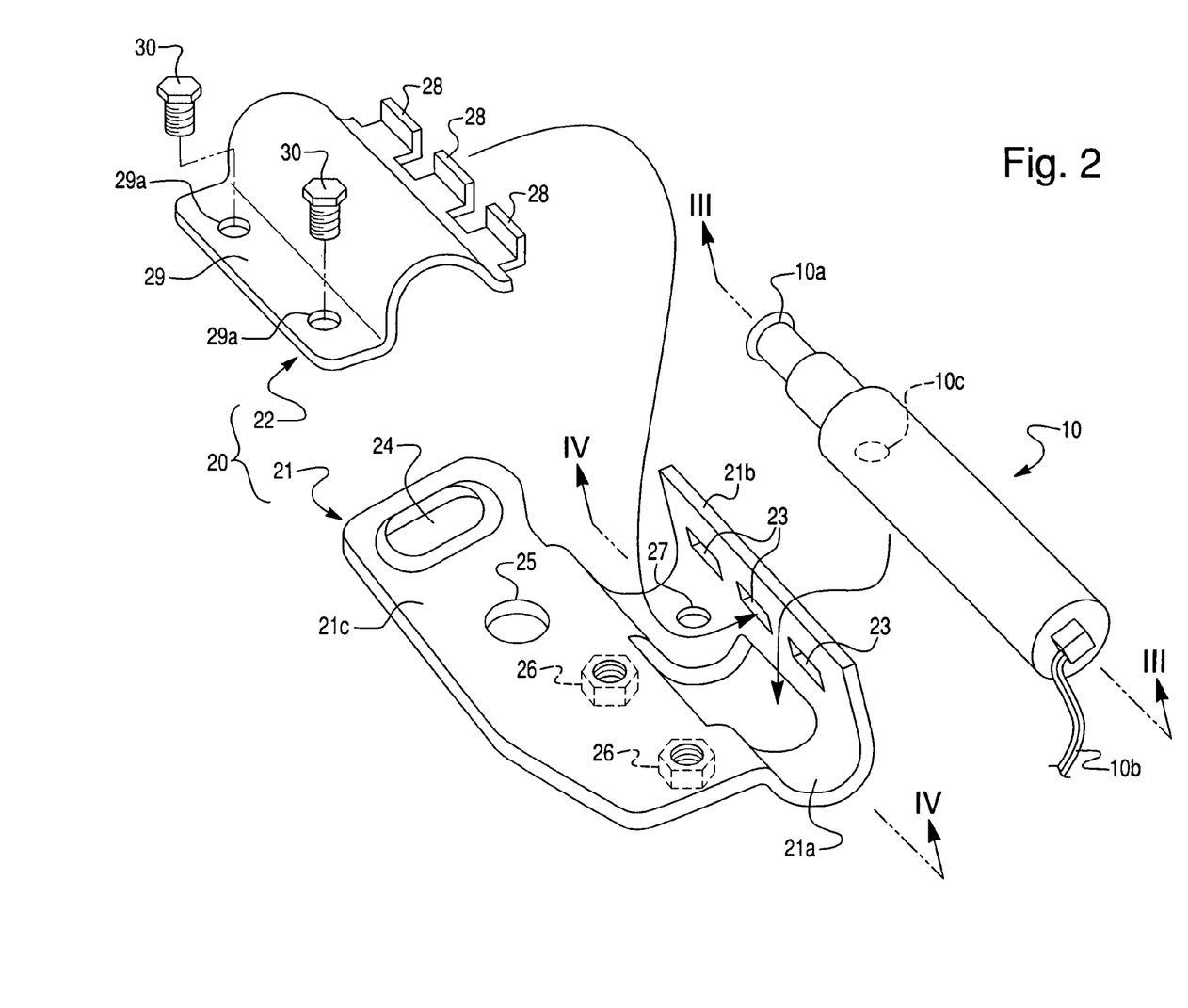
FIG. 2 is a layout of an attaching clamp serving as an attaching member.
Figure 3:
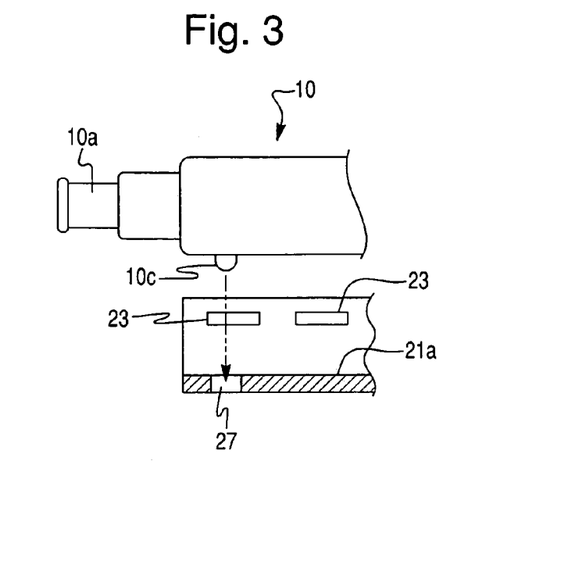
FIG. 3 is a cross-section along III-III line of FIG. 2.
Figure 4:
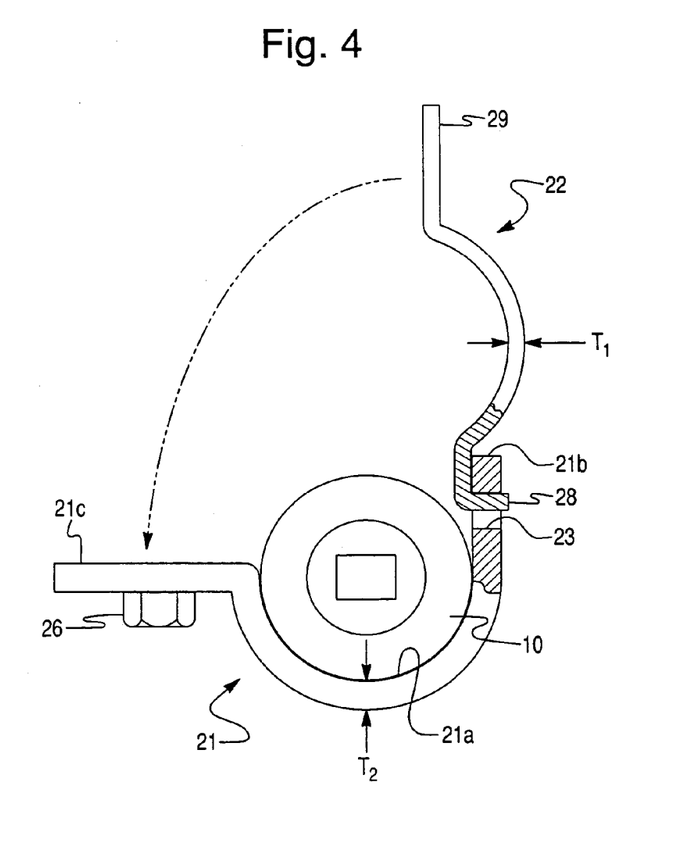
FIG. 4 is an explanatory view showing the inflator coupled to the attaching clamp.
Figure 5:
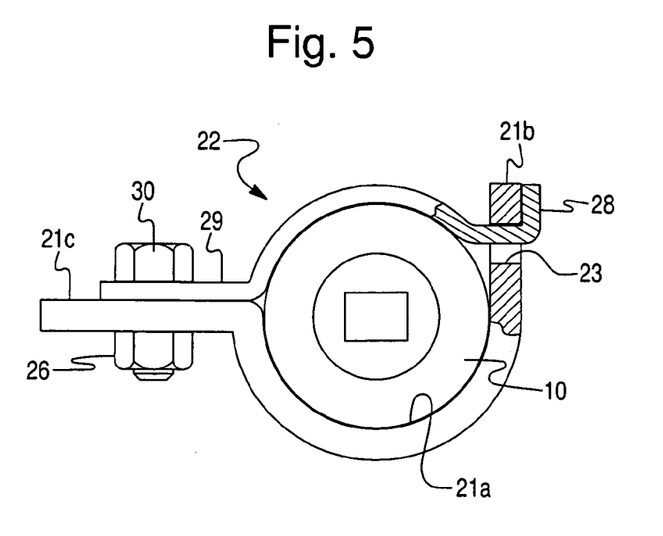
FIG. 5 is an explanatory view showing the attaching clamp sandwiching the inflator.

FIG. 1 is a side elevation showing a motor vehicle seat provided with an inflator attaching structure with respect to the embodiment, FIG. 2 is an exploded perspective view showing an attaching clamp serving as an attaching member, FIG. 3 is a cross-section along III-III line in FIG. 2, FIG. 4 is an explanatory view showing a sandwiching procedure of the inflator by mechanism of the attaching clamp, and FIG. 5 is an explanatory view of the attaching clamp sandwiching the inflator.

As shown in FIG. 1, a seat 1 is provided with a seat cushion 2 and a seat back 3 connected to the seat cushion 2. The seat cushion 2 is provided with a cushion pad 2a and a seat frame 2b.

One end side of an air belt (expansion-type seat belt) 5 is attached to a side face of the seat frame 2b via an attaching clamp 20.

The air belt 5 includes a shoulder belt portion 6 that is obliquely pulled around a front face side of an upper half of the body of an occupant seated on the seat 1, a lap portion 7, one end side of which is connected to a lower end of the shoulder portion 6 and the other end side of which is connected to the attaching clamp 20, being pulled around a front face side in the vicinity of a waist portion or a lower stomach portion of the occupant in the left and right direction, and a non-expansion type shoulder belt 8 connected to an upper end of the shoulder portion 6.

The shoulder belt 8 is hung through a shoulder anchor 9 provided at a pillar portion (not shown) of a vehicle body, and the tip end side thereof is capable of being retracted by mechanism of a seat belt retractor (not shown).

A portion between the shoulder portion 6 and the lap portion 7 is hung through a through-anchor of a tongue (not shown). A buckle device (not shown), to which the tongue is connected (latched), is provided at a side of the seat frame 2b opposite to that of the attaching clamp 20.

Gas is supplied to the lap portion 7 from an inflator 10 attached to the attaching clamp 20. Incidentally, the gas supplied from the inflator 10 is also introduced into the shoulder portion 6 via the lap portion 7 in this embodiment. However, the gas may be supplied to the shoulder portion 6 and the lap portion 7 from separate inflators.

The attaching clamp 20 is rotatably attached to the seat frame 2b in a front-and-back direction of the vehicle body by mechanism of a pivot 11.

Next, a construction of the attaching clamp 20 will be explained referring to FIGS. 2 through 5.

The attaching clamp 20 is composed of a main plate 21 connected to the seat frame 2b and a sub-plate 22 attached to the main plate 21, and the inflator 10 is sandwiched between the main plate 21 and the sub-plate 22.

In this embodiment, the inflator 10 is formed of a straight rod like shape (approximately a cylindrical shape), and a tube like gas-blowing out nozzle 10a protrudes in an extending direction of the axis line from one end (tip end) side thereof in an axis line direction. The inflator 10 is configured such that the gas is blown out in the extending direction of the axis line of the gas blowing-out nozzle 10a from the tip end thereof. A numeral 10b denotes a harness for power distribution for the inflator 10, which extends from the other end (rear end) of the inflator 10.

Incidentally, in this embodiment, a positioning projection 10c for positioning the inflator 10 to the attaching clamp 20 protrudes from a predetermined position of an outer peripheral surface of the inflator 10, as shown in FIG. 3.

An inflator holding portion 21a of the main plate 21 is formed into a cylindrical shape in a curved manner surrounding approximately a half of the outer peripheral surface of the inflator 10, as shown in FIGS. 4 and 5. As shown in the drawings, one end side 21b in the peripheral direction of the inflator holding portion 21a is extending in approximately a tangential line direction of the inflator 10, and a hook-portion hooking opening 23 is formed to serve as a hook opening for a hook portion 28, described later, at the one end side 21b. In this embodiment, three hook-portion hooking openings 23 are formed at different positions in the axis line direction of the inflator 10.

An approximately flat shaped base piece portion 21c is extended from the other end side in a peripheral direction of the inflator holding portion 21a toward approximately a radial direction of the inflator 10. As shown in FIG. 2, the base piece portion 21c is extended toward a tip end side (the side of the gas blowing-out nozzle 10a) in an axis line direction of the inflator 10 more than the inflator holding portion 21a, and a lap portion insertion hole 24 into which a tip end side of the aforementioned lap portion 7 is inserted is provided along an edge of a tip end side in the extending direction. The lap portion insertion hole 24 is extending in a direction intersecting with the axis line of the inflator 10.

In the vicinity of the center of the base piece portion 21c (at a position situated slightly nearer a rear end side of the inflator 10 in relation to the lap portion insertion hole 24 in the base piece portion 21c), a pivot hole 25 in which the aforementioned pivot 11 is inserted is provided.

A portion in the base piece portion 21c, situated at a rear end side of the inflator 10 from the pivot hole 25, is configured to form a portion in which a fastening portion 29, described later, overlaps thereon, and a nut 26 into which a bolt 30 for fastening the fastening portion 29 is screwed is firmly fixed at this portion. In this embodiment, two nuts 26 are provided in the axis line direction of the inflator 10 at the different positions thereof.

Incidentally, in this embodiment, a small hole 27, in which the aforementioned positioning projection 10c for positioning is engaged when the inflator 10 is correctly set to the inflator holding portion 21a, is formed at a bottom portion of the inflator holding portion 21a.

As shown in FIGS. 4 and 5, the sub-plate 22 is formed into a cylindrical shape in a curved manner surrounding an extent of a half of a remaining outer peripheral surface of the inflator 10, or an extent of a peripheral length slightly shorter than that. A hook portion 28 to catch a hook-portion hooking opening 23 protrudes from one end side in a peripheral direction of the sub-plate 22 (a side of the hook-portion hooking opening 23 of the main plate 21) to approximately a radial direction of the inflator 10. In this embodiment, the hook portion 28 is provided three in number in a positional relation corresponding to each of the hook-portion hooking openings 23. A tip end side of each of the hook portions 28 is formed into approximately an L-shape or a J-shape in an extending direction of one end side 21b of the aforementioned inflator holding portion 21a in a curved manner.

From the other side in a peripheral direction of this sub-plate 22 (a side of the base piece 21c of the main plate 21), a fastening portion 29 is protruding in a manner so as to be in parallel with the base piece portion 21c toward approximately a radial direction of the inflator 10. Two bolt insertion holes 29a are provided in the fastening portion 29 in an overlapping positional relationship with the nuts 26 provided on the base piece portion 21c.

Further, as shown in FIG. 4, in this embodiment, a plate thickness $T_1$ of the sub-plate 22 is configured to be smaller than a plate thickness $T_2$ of the main plate 21. In another embodiment, the plate thickness $T_1$ of the sub-plate 22 is configured to be equal or small than a plate thickness $T_2$ of the main plate 21.

When the inflator 10 is attached to the attaching clamp 20, firstly, the inflator 10 is fit in the inflator holding portion 21a of the main plate 21, as shown in FIG. 3. At this moment, the positioning projection 10c of the inflator 10 is engaged with the small hole 27 of the bottom face of the inflator holding portion 21a.

Next, as shown in FIG. 4, each of the hook portions 28 of the sub-plate 22 is hooked on each of the hook-portion hooking openings 23 of the main plate 21, and the sub-plate 22 is overlapped with the main plate 21 at a side opposite to the inflator 10, in a manner so as to rotate the sub-plate 22 about the hook openings of the hook-portion hooking opening 23 with the hook portion 28 that serve as a fulcrum, and the fastening portion 29 of the sub-plate 22 is configured to be situated in parallel with the base piece portion 21c of the main plate 21. Thereafter, the bolt 30 is screwed into the nut 26 via the bolt insertion hole 29a of the fastening portion 29, and thus the fastening portion 29 and the base piece portion 21c are fastened.

By constructing as described above, the inflator 10 is fixed in a manner sandwiched between the main plate 21 and the sub-plate 22.

Thereafter, the lap portion 7 of the air belt 5 is connected to the main plate 21 via the aforementioned lap portion insertion hole 24, and a gas introducing duct 7a of the lap portion 7 is connected to the gas blowing-out nozzle 10a of the inflator 10. Incidentally, when the lap portion 7 is connected to the main plate 21, a tip end side of the lap portion 7 is folded back and stitched with itself in a manner so as to surround an upper edge side of the lap portion insertion hole 24 after inserting the tip end side of the lap portion 7 into the lap portion insertion hole 24. However, the lap portion 7 may be connected to the main plate 21 before the inflator 10 is attached to the attaching clamp 20.

Thereafter, the main plate 21 is disposed at a side face of the seat frame 2b, and the pivot 11 is firmly fixed to the seat frame 2b through the aforementioned pivot hole 25. By constructing as described above, the main plate 21 (attaching clamp 20) is attached to the seat frame 2b, and attaching operation of the inflator 10 to the seat frame 2b is thereby completed.

In the attaching structure of the inflator 10 to the seat frame 2b by mechanism of the attaching clamp 20, since the inflator 10 is sandwiched between the main plate 21 and the sub-plate 22 of the attaching clamp 20, and the main plate 21 is attached to the seat frame 2b, the attaching operation of the inflator 10 to the seat frame 2b is firm.

In this embodiment, as described above, when attaching the inflator 10 to the attaching clamp 20, the hook portion 28 of the sub-plate 22 is hooked on the hook-portion hooking opening 23 of the main plate 21, and the fastening portion 29 and the base piece portion 21c are fastened with a bolt 30, upon situating the fastening portion 29 of the sub-plate 22 in parallel with the base piece portion 21c of the main plate 21 in a manner so as to sandwich the inflator 10 between the main plate 21 and the sub-plate 22. As a result, the sub-plate 22 can be easily fastened on to the main plate 21.

In this embodiment, the plate thickness $T_1$ of the sub-plate 22 is configured to be smaller than the plate thickness $T_2$ of the main plate 21. However, the inflator 10 may be sufficiently firmly attached because the main plate 21 is attached to the seat frame 2b. Incidentally, the weight of the sub-plate 22 can be reduced by reducing of the plate thickness $T_1$ of the sub-plate 22. Further, a bending process for the sub-plate can be performed with ease.

Further, the aforementioned embodiment is illustrative of the present invention and the present invention is not limited to the aforementioned embodiment.

For example, although the hook portion is provided in the sub-plate and the hook portion-hooking hole is provided in the main plate in the aforementioned embodiment, the hook portion may be provided in the main plate and the hook-portion hooking opening may be formed in the sub-plate.

In the aforementioned embodiment, although the attaching structure of the inflator of the air belt device to the seat frame is illustrated, the present invention is applicable of various inflator attaching structures, such as an inflator attaching structure of an air bag device for preventing the submarine phenomenon from occurring as described in the aforementioned JP Pub. No. '818, an inflator attaching structure for use in a side airbag device, or the like.

Figure 6:
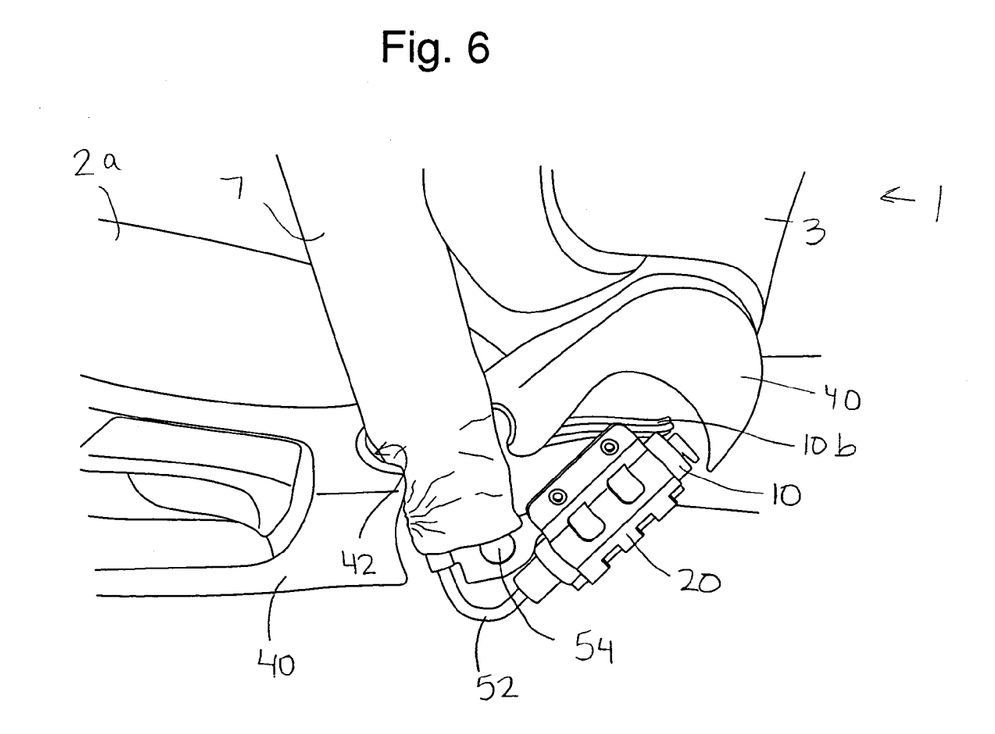
FIG. 6 is a side elevation showing a motor vehicle seat provided with an inflator attaching structure with respect to another embodiment.
Figure 7:
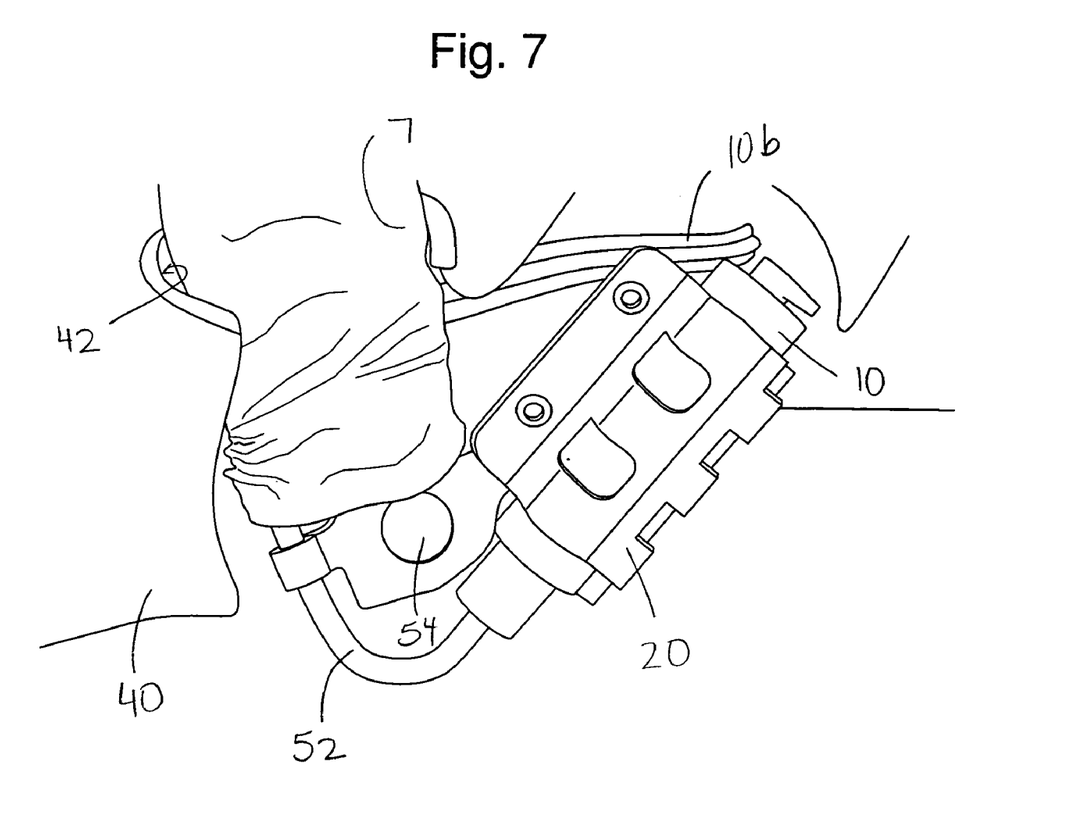
FIG. 7 is a detail side elevation showing the inflator attaching structure of FIG. 6.

In another embodiment, as shown in FIGS. 6 and 7, the inflator 10 is disposed in a seat finisher or garnish 40 of a vehicle seat 1 so that the overall appearance of the inflator 10 and vehicle seat 1 is improved. The inflator 10 of this embodiment may be similar to the previously disclosed embodiment and, for example, is held by the attaching clamp 20. The harness 10b for power distribution extends from one end of the inflator 10 and a duct 52 extends from an opposite end of the inflator to allow inflation fluid to pass from the inflator 10 to the lap portion 7 of the air belt 5. The inflator 10 is attached to the vehicle seat 1 via a fixing bolt 54. The fixing bolt 54, in an embodiment, can act as a pivot for the attaching clamp 20, such that the clamp 20 is rotatably attached to the seat 1.

The seat finisher 40 is a portion of the seat 1. The seat finisher 40 includes a groove 42 to allow the lap portion 7 of the air belt 5 to pass through the seat finisher 40. The groove 42 is configured so that the inflator 10 may be positioned underneath the seat finisher (and out of sight from an occupant) or next to the seat finisher 40. The groove 42 may allow for a more compact design so that only the lap portion 7 of the belt is visible to an occupant. The duct 52, inflator 10 and attaching clamp 20 are covered by the seat finisher 40.

Japan Priority Application 2005-295245, filed Oct. 7, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A structure for attaching an inflator, for expanding a bag of an expandable air belt, to a seat member of a vehicle body, wherein the seat member includes a lap anchor side and a buckle side, and wherein the structure comprises an attaching member that includes:

a main plate attached to the lap anchor side of the seat member;

a sub-plate attached to the main plate, wherein the inflator is sandwiched between the main plate and the sub-plate; and wherein a base end side of a lap portion of the expandable belt is connected to the main plate; and wherein the main plate is attached to the seat member in a manner so as to be rotatable in a front-and-back direction of a seat.

2. The structure according to claim 1, wherein a hook portion is provided at either one of the main plate or the sub-plate, and a hook opening to be caught by the hook portion is provided at the other plate, and wherein the hook portion catches the hook opening, and portions of the main plate and the sub-plate that are at a side opposite to the hook portion and hook opening across the inflator are fastened by a fastening member.

3. The structure according to claim 1, wherein a plate thickness of the sub-plate is configured to be smaller than a plate thickness of the main plate.

4. The structure according to claim 1, wherein a convex positioning portion is provided in either one of an outer peripheral surface of the inflator or an inflator-opposed surface of the attaching member, and an engaging portion for engaging the convex portion is provided in the other surface.

* * * * *